June 24, 1924.
J. A. McGUIRE
1,498,924
MANUFACTURE OF CARBON BLACK, LAMPBLACK, AND OTHER SUBSTANCES
Filed Nov. 6, 1922
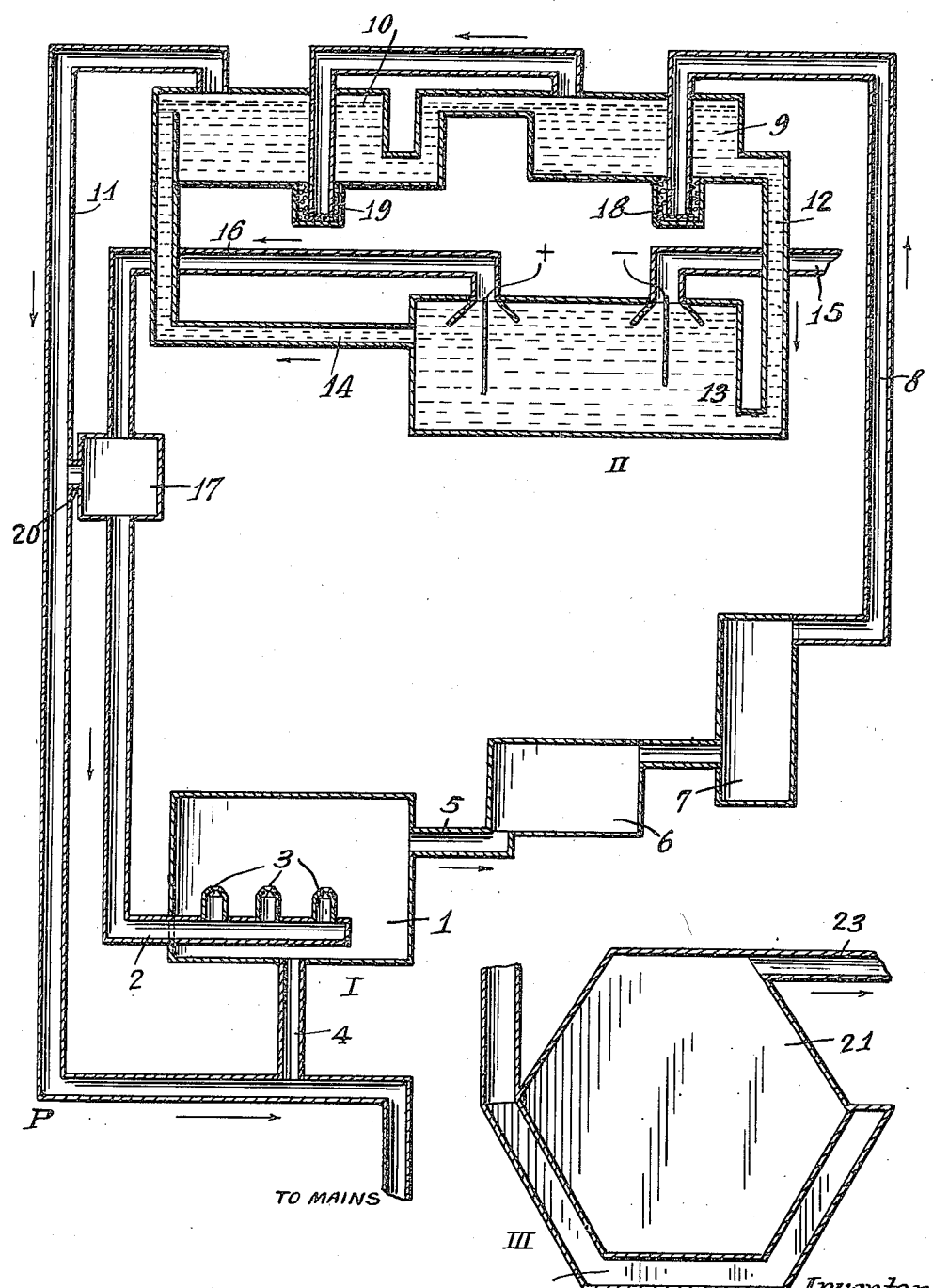
Inventor:
John Ashfield McGuire Patented June 24, 1924.

1,498,924

UNITED STATES PATENT OFFICE.

JOHN ASHFIELD McGUIRE, OF PRESCOTT, ARIZONA.

MANUFACTURE OF CARBON BLACK, LAMPBLACK, AND OTHER SUBSTANCES.

Application filed November 6, 1922. Serial No. 599,287.

*To all whom it may concern:*

Be it known that I, JOHN ASHFIELD MC-GUIRE, a citizen of the United States, and a resident of Prescott, in the county of Yavapai and State of Arizona, have invented certain new and useful Improvements in the Manufacture of Carbon Black, Lampblack, and Other Substances, of which the following is an exact and true specification.

The purpose of this invention is to recover a large part of the carbon in the gas or oil burned, by causing the hydrogen of the gas to combine with chlorine, either directly or indirectly, as set forth below, to free the carbon black or lamp black from undesirable absorbed gases, and to recover the chlorine used by decomposition of the resultant hydrochloric acid gas thus also recovering the hydrogen. The same method could also be used in any process where chlorine was converted to hydrochloric acid and it was desirable to recover the chlorine.

With the present system when the hydrocarbon is burned in an insufficient air supply, the per cent recovery is very small; approximately 3 (three) per cent. Some of the remaining carbon passes into the air as smoke, thus presenting a nuisance which it is difficult to escape. The hydrogen is of course totally wasted.

Various methods have been suggested to overcome this difficulty one of the most common being to construct burners having a higher efficiency and to limit the air supply as much as possible. But due to the fundamental principle upon which such a process must rest it is not possible by any amount of improvement to secure a high efficiency.

Another method is chlorination of the hydrocarbon to hydrochloric acid and carbon. Fundamentally this method is correct as it should secure a 100 (one hundred) per cent yield.

This may be done by the method described by Averill in Patent No. 1,238,734, or by Mott in Patent No. 1,259,121 or by the method set forth by me below in Figure I. In the processes of Averill and Mott the result will be a mixture of hydrochloric acid gas and carbon with probably some free chlorine, while in my process it will contain hydrocarbon gas in addition but no free chlorine.

My invention consists essentially of three main divisions which for convenience in illustration I have numbered in my drawing and shall refer to here as I, II, III.

Referring to the illustration, Figure I consists of a combustion chamber (1) where chlorine entering through pipe (2) is burned at the burner tips (3) in the hydrocarbon gas entering from pipe (4). The resulting products hydrochloric acid gas, carbon black and the excess of hydrocarbon gas pass through pipe (5) to the settling chamber (6) where most of the carbon black is precipitated and on to the electrical precipitator (7) where all the remaining carbon is taken care of. The gases are then ready for Figure II of the apparatus.

Here the gases pass through pipe (8) to the solution tanks 9 and 10 where the hydrochloric acid gas dissolves while the hydrocarbon gas passes on through pipe (11) to meet the incoming gas from the mains and go back to the combustion chamber through pipe (4). In order that the pressure of the gas in pipe (11) might be as great as that in the mains it would probably be necessary to install a pump at (P).

The hydrochloric acid formed is heavier than water and will sink through pipe (12) to the electrolytic tank (13) where it is electrolyzed. The water remaining will be lighter than the hydrochloric acid and will rise through pipe (14) to the solution tank (10) to be used over. Thus the cycle is complete. The hydrogen will be drawn off through pipe (15) to be used for any purpose desired while the chlorine will be drawn through pipe (16) to the chlorine reservoir (17) to be used over. A porous diaphragm shall be placed in the electrolytic tank (13) to separate the positive and negative electrodes.

(18) and (19) represent mercury cups. They are used to prevent a suck-back of the water should the apparatus stop accidentally. These mercury cups might be used in any hydrochloric acid plant or in any case where a soluble gas was being dissolved. Some other substance might be used instead of mercury.

Figure III consists of a chamber (21) surrounded by a steam jacket (22) and with a pipe (23) connected to an exhaust pump. The lampblack or carbon black which contained absorbed hydrochloric acid gas or other undesirable gases would be placed in the chamber (21) and by means of the steam jacket raised to any desirable temperature while the gases over the material in the chamber are exhausted by the pump. As a result of the heat and vacuum most of the gases would be liberated and drawn off by the exhaust pump.

In Figure I, where chlorine is burned in natural gas or other hydrocarbon gas with the production of hydrochloric acid gas and carbon, as there is an excess of hydrocarbon in the combustion chamber there will be no tendency for carbon tetrachloride to form. The percentage of hydrochloric acid gas will be low in the resultant mixture as only enough chlorine will be admitted to combine with a small percentage of the gas in the chamber. In this way the resultant carbon black will not contain much absorbed hydrochloric acid gas and absolutely no absorbed chlorine.

The above described process may be used with the vapor of a hydrocarbon oil instead of a hydrocarbon which is gaseous at ordinary temperatures. Wherever the term "hydrocarbon gas" is used in this specification or claims, it is to be construed to include the vapor of a hydrocarbon oil and also to include any mixture of the vapor of a hydrocarbon oil with a hydrocarbon which is gaseous at ordinary temperatures.

To ignite the chlorine in the combustion chamber an electric igniter might be used that would cause a spark to play across the burner tips. Valves could be placed at various points to control the starting and stopping of the apparatus. The arrows in the drawing indicate the direction of flow.

The apparatus described in Figure II might be used in connection with other processes than the one set forth in Figure I, especially the processes of Averill and Mott mentioned above. When used in conjunction with the process of Averill pipe (11) would carry chlorine and would lead through pipe (20), (shown in dotted lines) to the chlorine reservoir (17).

In case there were certain gases which it was desirable to have in the lampblack or carbon black, after it was removed from chamber (21) it could be subjected to these gases under pressure. The apparatus comprised in Figure III of this description and illustration of the apparatus could be used separately from the other parts.

In fact any of the Figures (I, II, III) may be used in conjunction with each other or separately.

This process may be carried out in a variety of ways and in any apparatus of suitable size and shape.

Having described my invention what I claim as new and desire to protect by Letters Patent is:

1. The process of making carbon black which consists of burning chlorine in an atmosphere of hydrocarbon gas, causing the formation of carbon black and hydrochloric acid gas.

2. The process of making carbon black which consists of burning chlorine in an atmosphere of natural gas, causing the formation of carbon black and hydrochloric acid gas.

3. The process of manufacturing carbon black which consists of causing chlorine to combine with hydrocarbon gas in the presence of an excess of the latter thus leaving some hydrocarbon gas in the resultant product.

4. The process of manufacturing carbon black which consists of causing chlorine to combine with natural gas in the presence of an excess of the latter thus leaving some natural gas in the resultant product.

In testimony whereof I hereunto set my signature.

JOHN ASHFIELD McGUIRE.